US009228290B2

(12) United States Patent
Noh et al.

(10) Patent No.: US 9,228,290 B2
(45) Date of Patent: Jan. 5, 2016

(54) WATER LEVEL SENSING APPARATUS, WATER SUPPLY HOSE AND WASHING MACHINE HAVING THE SAME

(75) Inventors: Tae Gyoon Noh, Suwon-si (KR); Jeong Su Han, Suwon-si (KR); Jun hoe Choi, Suwon-si (KR); Sang Yeon Pyo, Suwon-si (KR); Jong Soo Hong, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 890 days.

(21) Appl. No.: 13/452,023

(22) Filed: Apr. 20, 2012

(65) Prior Publication Data

US 2012/0298157 A1 Nov. 29, 2012

(30) Foreign Application Priority Data

May 24, 2011 (KR) ........................ 10-2011-0048949

(51) Int. Cl.
*A47L 15/42* (2006.01)
*D06F 39/08* (2006.01)

(52) U.S. Cl.
CPC ........... *D06F 39/087* (2013.01); *A47L 15/4217* (2013.01); *A47L 15/4244* (2013.01); *D06F 39/088* (2013.01); *Y02B 40/56* (2013.01); *Y10T 137/8158* (2015.04)

(58) Field of Classification Search
CPC .......................... D06F 39/088; A47L 15/4244
See application file for complete search history.

(56) References Cited

U.S. PATENT DOCUMENTS 5,144,835 A * 9/1992 McDonald .................. 73/304 C
5,477,727 A * 12/1995 Koga .......................... 73/304 C

FOREIGN PATENT DOCUMENTS

JP 2003-154190 5/2003

* cited by examiner

*Primary Examiner* — Jason Ko
(74) *Attorney, Agent, or Firm* — Staas & Halsey LLP

(57) ABSTRACT

A water level sensing apparatus which more precisely senses a level of supplied water, a water supply hose and a washing machine having the same is provided. The water level sensing apparatus includes a main body provided with an inner wall and an outer wall and filled with water supplied to the inside of the inner wall, a plurality of electrodes inserted between the inner wall and the outer wall to be opposite to each other, and a micro-computer to judge a water level in the main body through variation of a capacitance value of the plurality of electrodes. Therethrough, the water level sensing apparatus more directly measures a water level, as compared to the conventional water level sensing apparatus, thus improving precision in water level measurement. Thereby, the water level sensing apparatus prevents unnecessary water supply and reduces energy consumption.

15 Claims, 12 Drawing Sheets

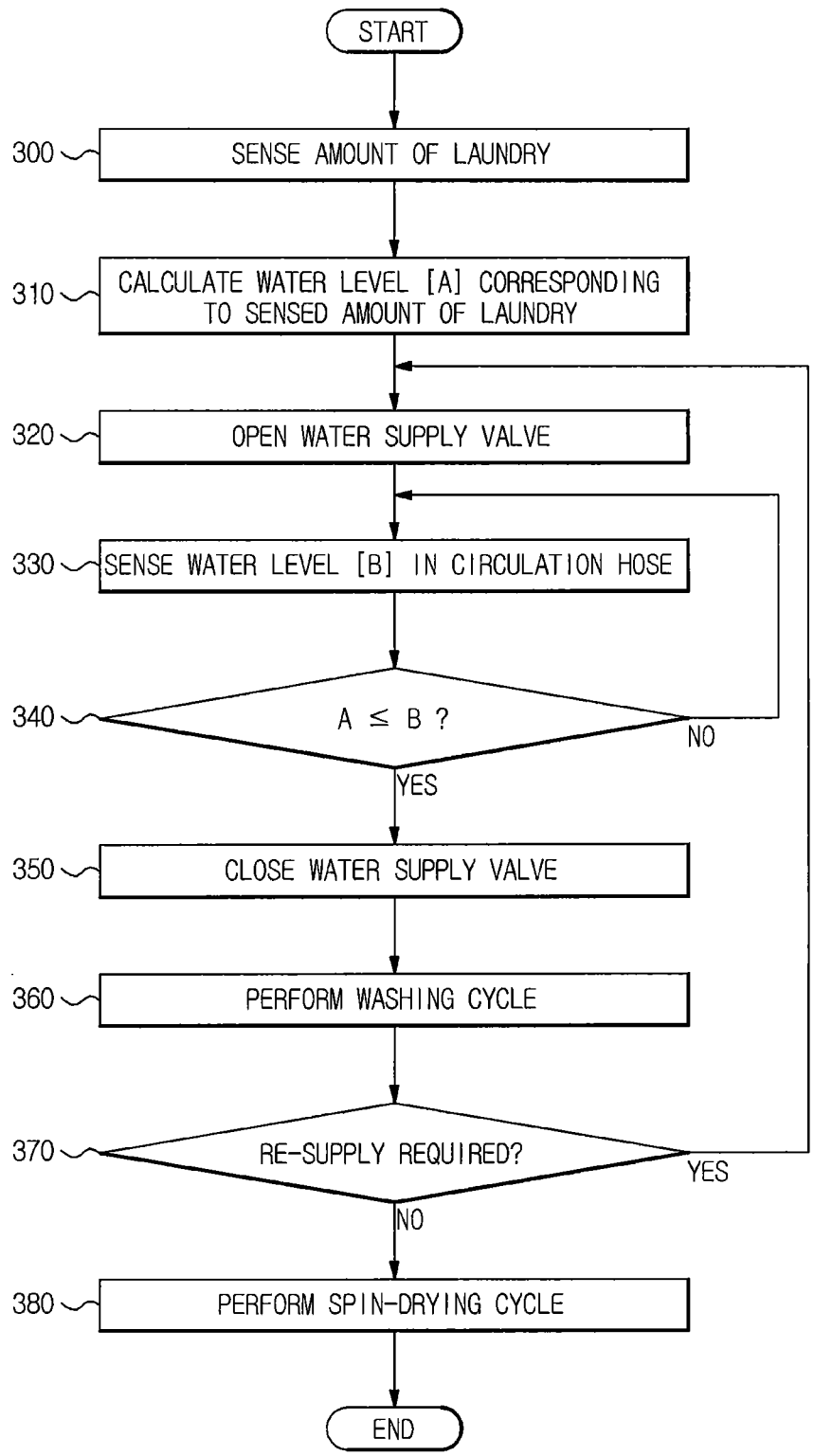

WATER LEVEL SENSING APPARATUS, WATER SUPPLY HOSE AND WASHING MACHINE HAVING THE SAME

CROSS-REFERENCE TO RELATED APPLICATIONS

This application claims the priority benefit of Korean Patent Application No. 2011-0048949, filed on May 24, 2011 in the Korean Intellectual Property Office, the disclosure of which is incorporated herein by reference.

BACKGROUND

1. Field

Embodiments relate to a water level sensing apparatus to sense a level of supplied water, a water supply hose and a washing machine having the same.

2. Description of the Related Art

In general, a level or an amount of water supplied to a washing machine or a dishwasher is important in operation of the washing machine or the dishwasher. For example, in case of a washing machine, an amount of water corresponding to an amount of laundry to be washed needs to be supplied so as to perform effective washing. That is, when the amount of supplied water is smaller than the amount of laundry to be washed, washing is not effectively carried out, and when the amount of supplied water is greater than the amount of laundry to be washed, a large amount of water is unnecessarily consumed and an excessively large amount of power is consumed due to consumption of the large amount of water. In order to supply the amount of water corresponding to the amount of the laundry to be washed, a water level within a tub of the washing machine needs to be precisely sensed.

Water level sensing methods generally include a water level sensing method using a mechanical water level sensing apparatus and a water level sensing method using a semiconductor pressure sensor. These water level sensing methods applied to a washing machine will be described as follows.

First, the water level sensing method using the mechanical water level sensing apparatus will be described. When a water level within a tub of a washing machine is raised due to water supplied to the inside of the tub, an air pressure between a water surface within a connection hose and the water level sensing apparatus is increased. The increased air pressure pushes a diaphragm of the mechanical water level sensing apparatus upward, and then the diaphragm pushes a core upward. A magnetic flux density value is varied by interaction between the core and a bobbin surrounding the core. The magnetic flux density value resonates together with a capacitance value in an operating circuit and is output as a frequency. An output frequency value is varied due to the magnetic flux density value varied according to the water level, and the water level within the tub of the washing machine is judged thereby.

Next, the water level sensing method using the semiconductor pressure sensor will be described. The semiconductor pressure sensor includes a diaphragm to which a strain gauge is attached. In the same manner as the water level sensing apparatus using the core and the bobbin, the diaphragm is deformed by variation of an air pressure and the strain gauge measures such deformation of the diaphragm, thereby measuring a water level.

The above-described conventional water level sensing apparatuses are repeatedly driven by mechanical operation, thus having low durability. Further, the conventional water level sensing apparatuses are operated by the received air pressure and have great water level variation due to change of a volume within the hose and change of an air density, thus unnecessarily wasting water and power.

SUMMARY

It is an aspect of one or more embodiments to provide a water level sensing apparatuses to more precisely sense a level of water supplied to a washing machine, etc.

Additional aspects will be set forth in part in the description which follows and, in part, may be learned by practice of the embodiments.

In accordance with an aspect of one or more embodiments, there is provided a water level sensing apparatus includes a main body provided with an inner wall and an outer wall and filled with water supplied to the inside of the inner wall, a plurality of electrodes inserted between the inner wall and the outer wall to be opposite to each other, and a micro-computer to judge a water level in the main body through variation of a capacitance value of the plurality of electrodes.

A distance between the plurality of electrodes and the inner wall of the main body may be less than 5 □.

The capacitance value of the plurality of electrodes may be linearly increased or decreased in proportion to a rate at which water fills between the plurality of electrodes.

The plurality of electrodes may be installed on a part or the entirety of the main body.

In accordance with an aspect of one or more embodiments, there is provided a water supply hose includes an inner wall and an outer wall, and a water level sensing apparatus including a plurality of electrodes inserted between the inner wall and the outer wall to be opposite to each other and a micro-computer to judge a water level through variation of a capacitance value of the plurality of electrodes.

The water supply hose may be formed in an integral type or a combination type having at least two water supply hose units and a connection unit.

The plurality of electrodes may be installed on a part or the entirety of the water supply hose in the integral type.

The plurality of electrodes may be installed on at least one of the at least two connection hose units of the water supply hose in the combination type.

In accordance with an aspect of one or more embodiments, there is provided a washing machine includes a water level sensing apparatus and a connection hose to guide wash water supplied to the inside of a tub of the washing machine to the water level sensing apparatus, wherein the water level sensing apparatus includes a main body provided with an inner wall and an outer wall and filled with water supplied to the inside of the inner wall, a plurality of electrodes inserted between the inner wall and the outer wall to be opposite to each other, and a micro-computer to judge a water level in the main body through variation of a capacitance value of the plurality of electrodes, and the micro-computer judges the judged water level in the main body to be a level of the wash water in the tub.

The water level sensing apparatus may be installed at one side of the inside of the tub.

The water level sensing apparatus may be attached to the tub and installed along the inner curved surface of the tub.

In accordance with an aspect of one or more embodiments, there is provided a washing machine includes a cabinet in which a tub is installed, a circulation hose along which wash water moves from the lower portion of the tub to the upper portion of the tub so as to be circulated, a circulation pump installed at the circulation hose to forcibly circulate the wash water, and a water level sensing apparatus includes a plurality of electrodes inserted between an inner wall and an outer wall of the circulation hose to be opposite to each other, and a micro-computer to calculate a level of wash water in the circulation hose through variation of a capacitance value of the plurality of electrodes and to judge the calculated level to be a level of the wash water in the tub.

The circulation hose may be attached to the tub and installed along the outer circumferential curved surface of the tub.

The plurality of electrodes may be installed on a part of the circulation hose corresponding to a height range at which wash water or laundry is locatable in the tub.

The circulation hose may include a plurality of electrode exposure parts formed by removing the outer wall of the circulation hose from parts of the circulation hose, the water level sensing apparatus may further include a connector electrically connecting the plurality of electrode exposure parts to the micro-computer, and the connector may include protruding electrode connection parts corresponding to the plurality of electrode exposure parts to electrically connect the plurality of electrode exposure parts to the micro-computer.

In accordance with an aspect of one or more embodiments, there is provided a washing machine including a cabinet in which a tub connected to a circulation hose is installed; a water level sensing apparatus includes a plurality of electrode exposure parts formed by removing parts of an outer wall of the circulation hose to expose a plurality of electrodes which face each other and a micro-computer to calculate a level of wash water in the circulation hose through variation of a capacitance value of the plurality of electrodes and to judge the calculated level to be a level of the wash water in the tub, wherein: the water level sensing apparatus further includes a connector electrically connecting the plurality of electrode exposure parts to the micro-computer; and the connector includes protruding electrode connection parts corresponding to the plurality of electrode exposure parts to electrically connect the plurality of electrode exposure parts to the micro-computer.

BRIEF DESCRIPTION OF THE DRAWINGS

These and/or other aspects of embodiments will become apparent and more readily appreciated from the following description of embodiments, taken in conjunction with the accompanying drawings of which:

FIG. 12 is a flowchart illustrating an operating process of a washing machine having a water level sensing apparatus in accordance with an embodiment.

DETAILED DESCRIPTION

Figure 1:
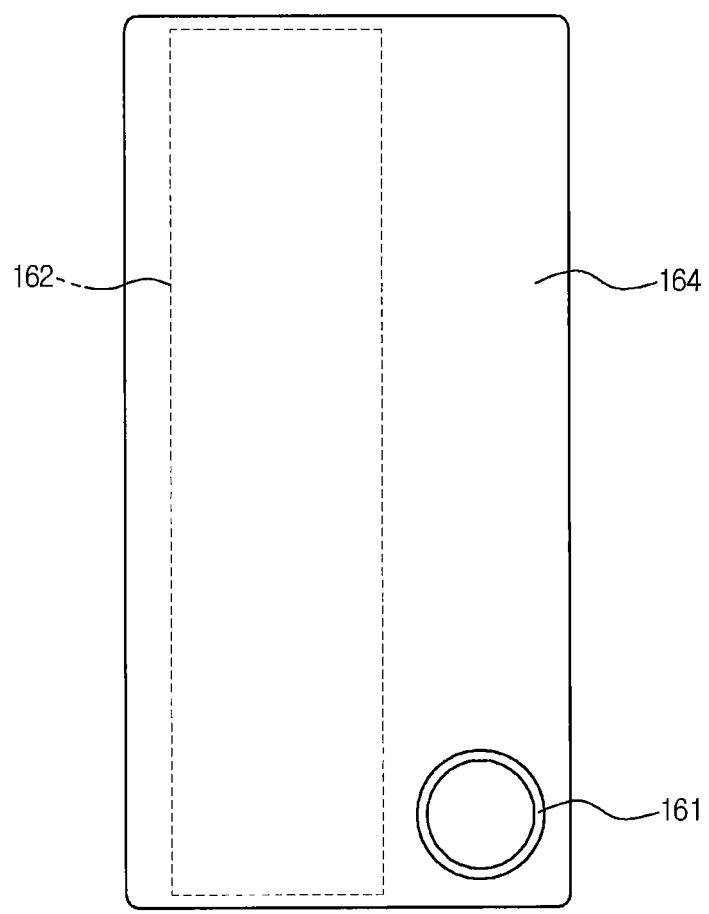
FIG. 1 is a schematic view illustrating a water level sensing apparatus in accordance with an embodiment.

Reference will now be made in detail to embodiments, examples of which are illustrated in the accompanying drawings, wherein like reference numerals refer to like elements throughout.

Figure 2:
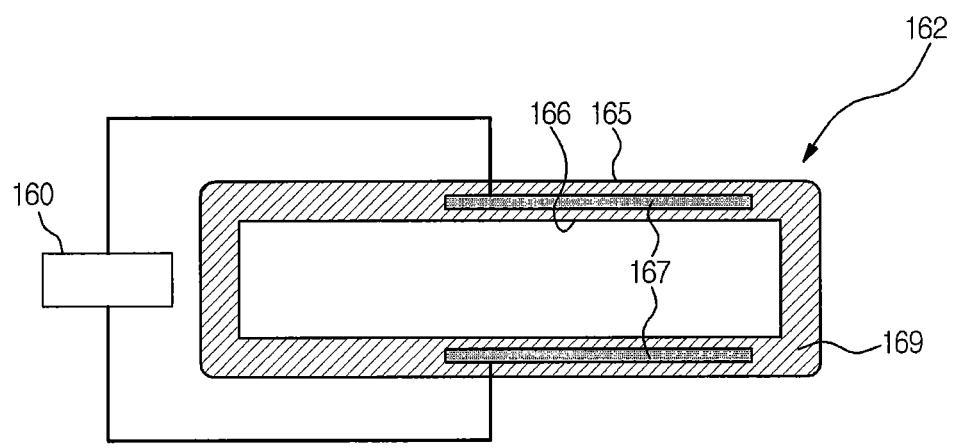
FIG. 2 is a transversal-sectional view of the water level sensing apparatus in accordance with an embodiment.
Figure 3:
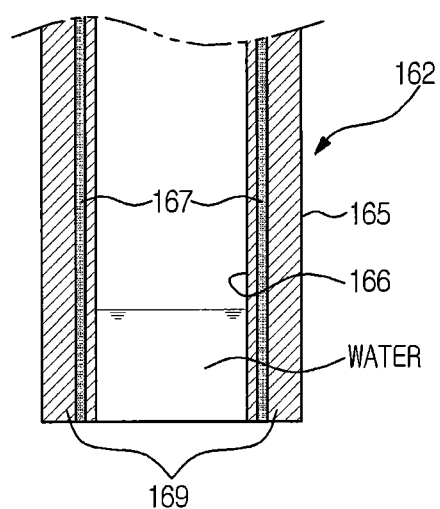
FIG. 3 is a longitudinal-sectional view of the water level sensing apparatus in accordance with an embodiment.

First, a water level sensing apparatus in accordance with one embodiment will be described with reference to FIGS. 1 to 3. FIG. 1 is a schematic view illustrating the water level sensing apparatus in accordance with an embodiment, FIG. 2 is a transversal-sectional view of the water level sensing apparatus in accordance with an embodiment, and FIG. 3 is a longitudinal-sectional view of the water level sensing apparatus in accordance with an embodiment.

A water level sensing apparatus 162 in accordance with this embodiment includes a main body 169 provided with an inner wall 166 and an outer wall 165 and filled with water supplied to the inside of the inner wall 166, a plurality of electrodes 167 (here, two electrodes) inserted between the inner wall 16 and the outer wall 165 to be opposite to each other, and a micro-computer 160 to judge a water level in the main body 169 through variation of a capacitance value of the plural electrodes 167. As shown in FIG. 2, the plural electrodes 167 of the water level sensing apparatus 162 are electrically connected to the micro-computer 160.

Now, an operating principle of the water level sensing apparatus 162 will be described, as follows. If water is supplied to a washing machine requiring measurement of a water level, the supplied water moves to a designated space 164 through a connection path 161. The moved water fills the water level sensing apparatus 162 in the height direction. A dielectric between the plural electrodes 167 inserted into the main body 169 includes air and water. A capacitance value of the dielectric is varied according to a rate of air and wash water, and a water level within the designated space 164 may be determined based on the varied capacitance value.

The plural electrodes 167 include at least two electrodes in pairs. This embodiment illustrates two electrodes 167. The shape of the water level sensing apparatus 162 into which the two electrodes 167 are inserted is shown in FIGS. 1 to 3. The two electrodes 167 may be inserted between the outer wall 165 and the inner wall 166 of the main body 169 so as to be opposite to each other. In this case, a distance $d_1$ between the electrode 167 and the inner wall 166 may have a random value, but may be less than 5 mm so as to improve sensitivity of the water level sensing apparatus 162. That is, as the distance $d_1$ between the electrode 167 and the inner wall 166 is smaller, sensitivity of the water level sensing apparatus 162 is improved. Further, in order to precisely sense the level of water filling the water level sensing apparatus 162, the electrodes 167 need to be less influenced by external environments. Therefore, a distance $d_2$ between the electrode 167 and the outer wall 165 is sufficiently maintained.

Further, the capacitance value (C) of the electrodes 167 may be determined by Equation 1 below.

$$C = \frac{\varepsilon_0 \varepsilon_r S}{d}$$

Equation 1

Here, C is a capacitance value of the electrodes 167, $\varepsilon_0$ is a dielectric constant of a vacuum, $\varepsilon_r$ is a relative dielectric constant, S is an area of the electrodes 167, and d is a distance between the electrodes 167.

Figure 5:
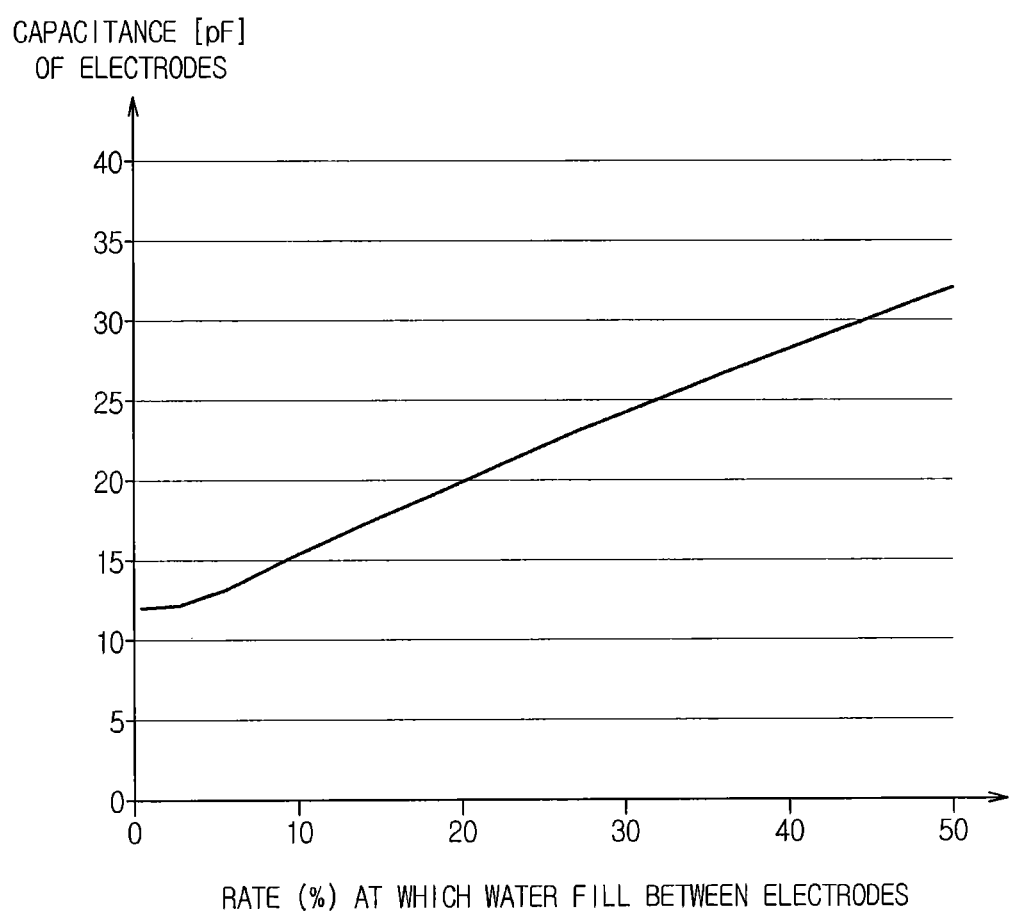
FIG. 5 is a graph illustrating variation of a capacitance value of electrodes according to a rate at which wash water fills between the electrodes of a water level sensing apparatus in accordance with an embodiment.

The two electrodes 167 and the dielectric present between the two electrodes 167 form one capacitor, and the capacitance value (C) of the capacitor is directly proportional to the relative dielectric constant ($\varepsilon_r$) of a substance between the electrodes 167 based on Equation 1 above. Here, the relative dielectric constant ($\varepsilon_r$) is determined by the rate at which wash water fills between the electrodes 167, as described above. FIG. 5 is a graph illustrating variation of the capacitance value of the electrodes 167 according to the rate at which water fills between the electrodes 167. As shown in FIG. 5, the capacitance value of the electrodes 167 is linearly increased or decreased in proportion to the rate at which water fills between the electrodes 167.

Further, the plural electrodes 167 may be installed on a part or the entirety of the main body 169.

Figure 4:
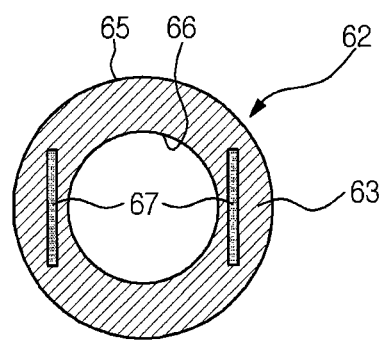
FIG. 4 is a transversal-sectional view of a water level sensing apparatus in accordance with an embodiment.
Figure 6:
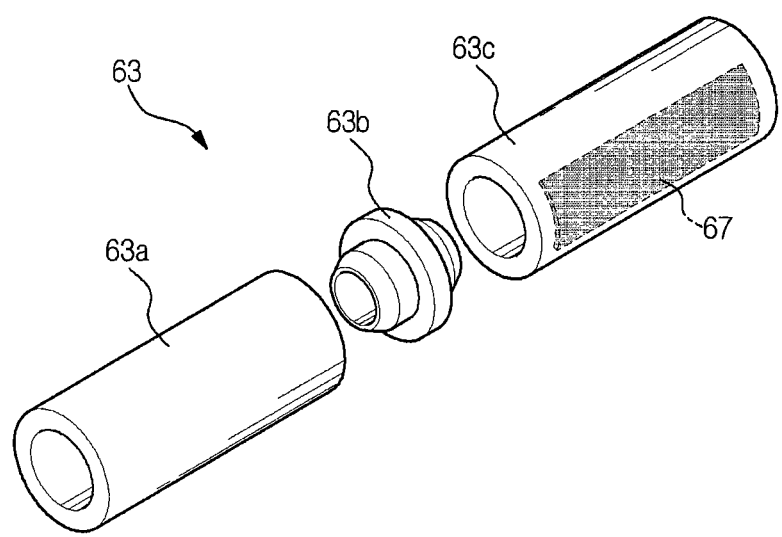
FIG. 6 is an exploded perspective view of a water supply hose in accordance with an embodiment.

Next, a water level sensing apparatus in accordance with an embodiment will be described with reference to FIGS. 4 and 6. FIG. 4 is a transversal-sectional view of the water level sensing apparatus in accordance with an embodiment, and FIG. 6 is an exploded perspective view of a water supply hose in accordance with an embodiment.

As shown in FIG. 4, a water level sensing apparatus 62 in accordance with this embodiment is directly formed within a water supply hose 63, i.e., a path along which water moves, without the main body 169 of the water level sensing apparatus 162 in accordance with the earlier embodiment. That is, two electrodes 67 are inserted between an outer wall 65 and an inner wall 66 of the water supply hose 63 so as to be opposite to each other, a capacitance value of the electrodes 67 is varied according to a rate at which water fills between the electrodes 67, and a water level within the water supply hose 63 is sensed based on the varied capacitance value.

Next, the water supply hose 63 in accordance with this embodiment will be described with reference to FIG. 6. FIG. 6 is an exploded perspective view of the water supply hose in accordance with this embodiment. The water supply hose 63 may be implemented integrally or by combining at, least two units using a connector. For example, a water supply hose 63 may be implemented in an integral type including one hose, or may be implemented in a combination type including at least two water supply hose units (sections or parts) 63a and 63c and a connection unit (connector) 63b, as shown in FIG. 6.

Further, the plural electrodes 167 may be installed on a part or the entirety of the integral-type water supply hose 63, and particularly be installed at a part of the water supply hose 63 in which water level sensing is required. That is, the plural electrodes 167 may be installed in a designated range of the water supply hose 63 in which water level sensing is required. In this case, since the electrodes 67 are installed only at a part of the water supply hose 63 in which water level sensing is required, an installation range of the electrodes 67 may be effectively reduced and manufacturing costs of the water supply hose 63 may be lowered.

Further, as shown in FIG. 6, the plural electrodes 67 may be installed on at least one of the water supply hose units 63a and 63c. That is, the plural electrodes 67 may be installed on at least one of the water supply hose units 63a and 63c corresponding to a designated range in which water level sensing is required. In this case, since the electrodes 67 are installed only on a part of the water supply hose 63 in which water level measurement is substantially required, an installation range of the electrodes 67 may be effectively reduced and manufacturing costs of the water level sensing apparatus 62 may be lowered.

Figure 7:
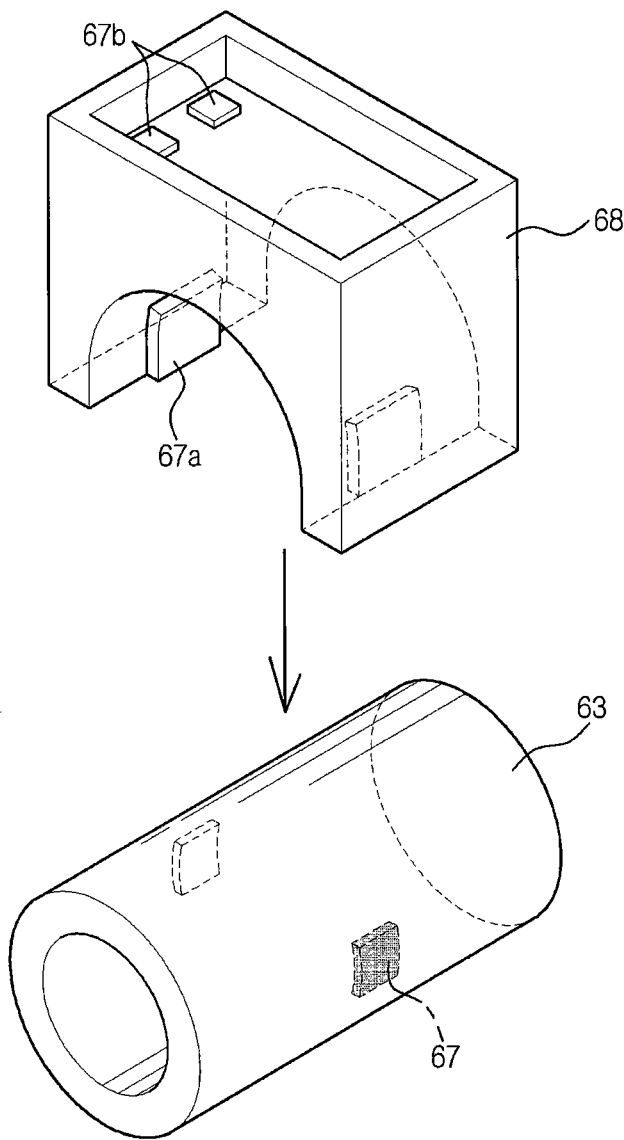
FIG. 7 is a perspective view illustrating the water supply hose and a connector connected thereto in accordance with an embodiment.

Next, connection of the electrodes 67 and the micro-computer 160 of the water level sensing apparatus 62 in accordance with an embodiment will be described with reference to FIG. 7. FIG. 7 is a perspective view illustrating the water supply hose and a connector connected thereto in accordance with an embodiment.

In general, the plural electrodes 67 of the water supply hose 63 and the micro-computer 160 are electrically connected through an electric wire. Electrical connection between the electrodes 67 and the micro-computer 160 through the electric wire may cause inconvenience in disposal of the electric wire and lowering of sensitivity of the water level sensing apparatus 62. In order to solve these problems, the outer wall 65 is removed from parts of the water supply hose 63, as shown in FIG. 7, thereby forming electrode exposing parts. Then, the electrodes 67 exposed through the electrode exposing parts are electrically connected to the micro-computer 160 through a connector 68. Such a connector 68 includes protruding electrode connection parts 67a corresponding to the exposed electrodes 67 so as to electrically connect the exposed electrodes 67 to the micro-computer 160. The connector 68 further includes connection parts 67b for electrical connection to the micro-computer 160. Thereby, inconvenience in disposal of the electric wire and lowering of sensitivity of the water level sensing apparatus 62 caused by usage of the electric wire may be solved.

Figure 8:
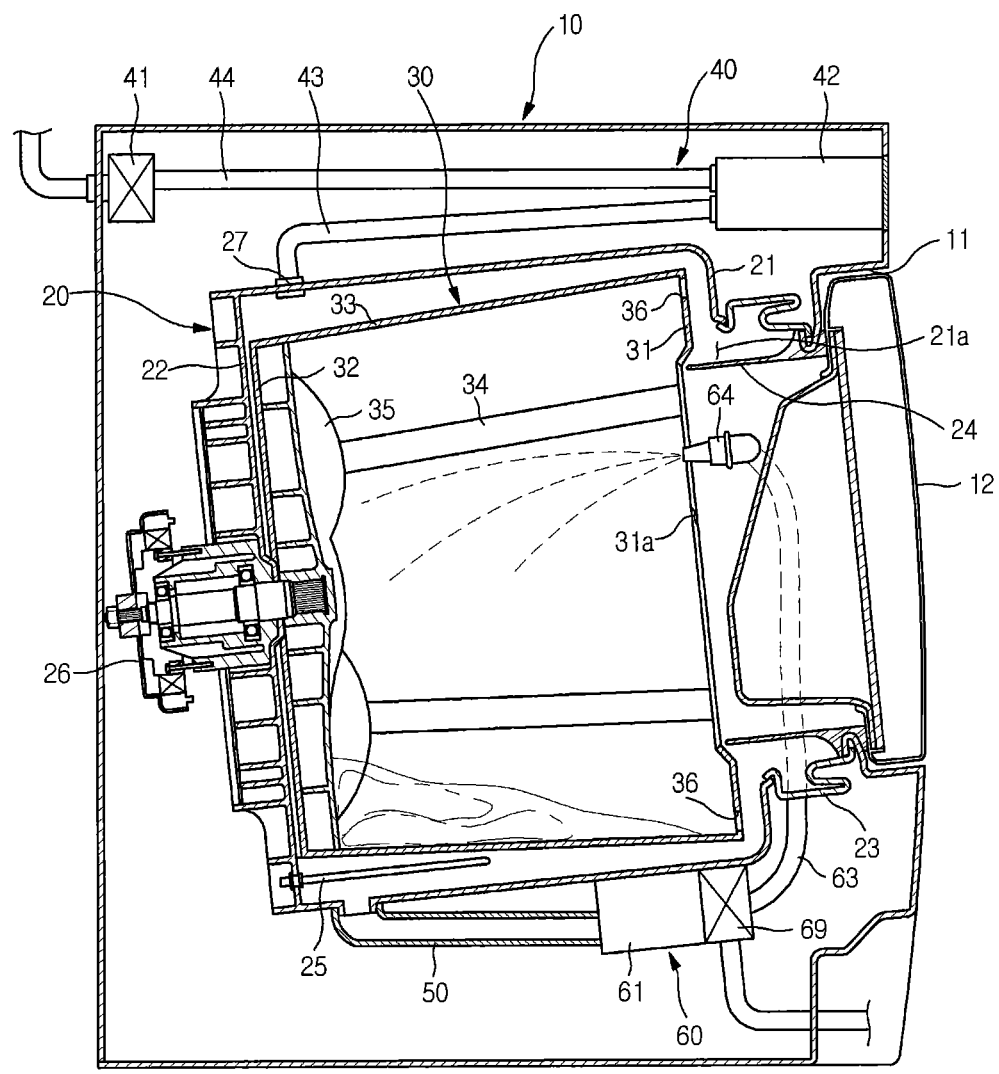
FIGS. 8 to 10 are sectional views illustrating the configurations of washing machines, each having a water level sensing apparatus, in accordance with one or more embodiments.
Figure 9:
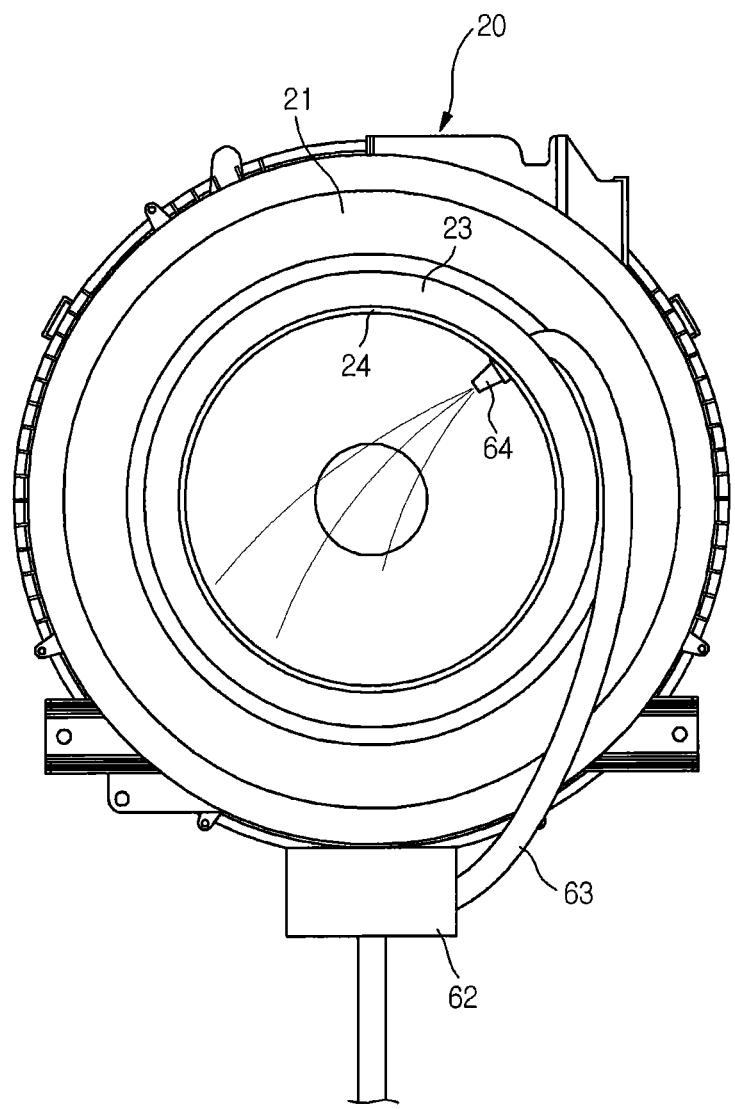
Figure 10:
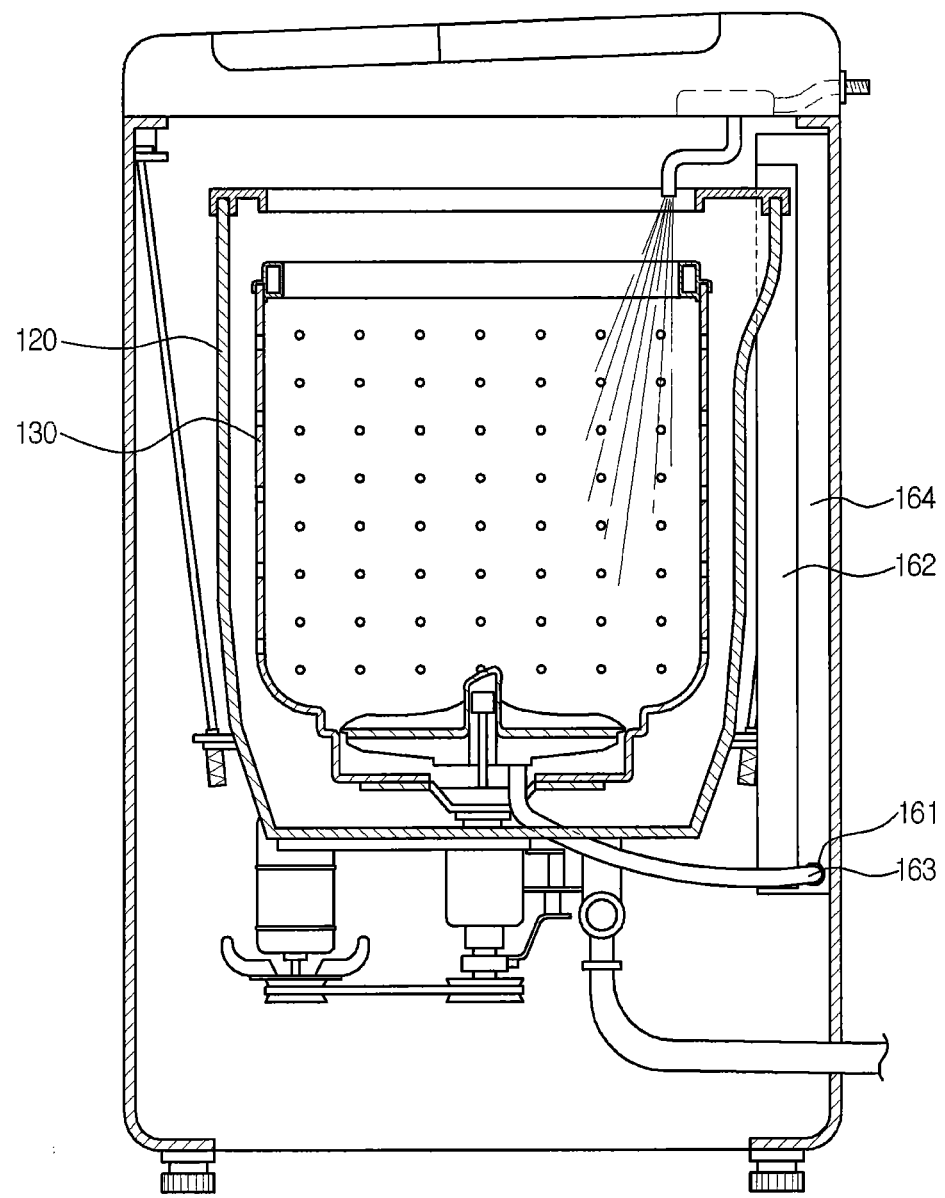

Hereinafter, washing machines, each having a water level sensing apparatus, in accordance with one or more embodiments will be described with reference to FIGS. 8 to 10. FIGS. 8 to 10 are sectional views illustrating the configurations of the washing machines, each having the water level sensing apparatus, in accordance with one or more embodiments.

A drum washing machine in accordance with another embodiment, as shown in FIG. 8, includes a cabinet 10 forming the external appearance of the drum washing machine, a cylindrical tub 20 inclined and provided within the cabinet 10 to contain wash water, a drum 30 rotatably installed within the tub 20, a water supply device 40 to supply detergent and wash water to the inside of the tub 20, a drain hose 50 to drain wash water within the tub 20 to the outside, and a wash water circulation device 60 to supply the wash water within the tub 20 to the inside of the drum 30.

The cabinet 10 has an approximately box shape, an inlet 11 through which laundry is put into and taken out of the drum 30 is formed on the front surface of the cabinet 10, and a door 12 to open and close the inlet 11 is hinged to one side of the inlet 11.

The tub 20 installed within the cabinet 10 is inclined such that a front surface 21 of the tub 20 provided with an opening 21a is higher than a rear surface 22 of the tub 20. The tub 20 includes a diaphragm 23 having a cylindrical shape and provided at the opening 32a of the front surface 21 to prevent leakage of wash water to a gap between the inlet 11 of the cabinet 10 and the opening 21a of the tub 20, and a guide member 24 provided at the inside of the diaphragm 23 to guide laundry to be easily put into and taken out of the tub 20.

The tub 20 further includes a heater 25 provided at the lower region of the inside of the rub 20 to heat wash water supplied to the inside of the tub 20.

A drive motor 26 to rotate the drum 30 is installed at the outside of the rear surface 22 of the tub 20. Further, a supply hole 27 to supply wash water from the water supply device 40 to the inside of the tub 20 is formed on the upper portion of the outer circumferential surface of the tub 20.

In the same manner as the tub 20, the drum 30 installed within the tub 20 is inclined such that a front surface part 31 of the drum 30 provided with an opening 31a is higher than a rear surface part 32 of the drum 30. The drum 30 includes the front surface part 31 provided with the opening 31a formed at the center thereof, the rear surface part 32 to which the drive motor 26 is connected, and a cylindrical part 33 connected to the front surface part 31 and the rear surface part 32.

A plurality of lifts 34 to lift and then drop laundry in the drum 30 during rotation of the drum 30 is installed on the inner surface of the cylindrical part 33 of the drum 30, and a plurality of stirring protrusions 35 to improve washing force is installed on the inner surface of the rear surface part 32 of the drum 30.

The cylindrical part 33 is configured such that the inner diameter of the cylindrical part 33 is increased from the rear surface part 32 to the front surface part 31, and a plurality of through holes 36 is formed along the edge of the front surface part 31 so as to pass wash water. Therefore, if the drum 30 is rotated at a high speed, laundry moves toward the front surface part 31 by the centrifugal force and wash water is discharged to the outside of the drum 30 through the through holes 36.

Since the rear surface part 32 and the cylindrical part 33 of the drum 30 are solid and the drum 30 is inclined, wash water introduced into the tub 20 through the supply hole 27 is supplied to the inside of the drum 30 through the through holes 36 of the front surface part 31 of the drum 30, and the wash water supplied to the inside of the drum 30 is collected in the drum 30. Here, the wash water supplied to the inside of the drum 30 reaches a height where the through holes 36 are formed, and thus a proper amount of the wash water is contained in the drum 30 and effective washing of the laundry is achieved.

The water supply device 40 is provided at the upper portion of the inside of the cabinet 10. The water supply device 40 includes a water supply control valve 41 to control wash water supplied to the inside of the cabinet 10, a detergent supply unit (container) 42 to store detergent, a first water supply pipe 43 connecting the connecting the water supply control valve 41 and the detergent supply unit 42, and a second water supply pipe 44 to supply the wash water in which the detergent is dissolved via the detergent supply unit 42 to the inside of the tub 20. Therefore, the wash water to be supplied to the inside of the tub 20 is supplied to the tub 20 via the detergent supply unit 42 under the condition that the detergent stored in the detergent supply unit 42 is dissolved in the wash water.

Further, the drain hose 50 to drain the wash water within the tub 20 to the outside of the cabinet 10 is provided at the lower portion of the inside of the cabinet 10.

The drum washing machine in accordance with an embodiment includes the wash water circulation device 60 to supply the wash water within the tub 20 to the inside of the drum 20. The wash water circulation device 60 includes a circulation pump 61 to pump the wash water within the tub 20 so as to supply the wash water to the inside of the drum 30, a flow path conversion valve 69 installed in the middle of the drain hose 50 connected to the outlet of the circulation pump 61, a circulation hose 63 extended from the flow path conversion valve 69 to the opening 31a of the drum 30, and a spray nozzle 64 installed at the outlet of the circulation hose 63.

The circulation pump 61 serves to provide pumping force to drain the wash water within the tub 20 and to supply the wash water within the tub 20 to the inside of the drum 30, and is provided below the cylindrical part 33 of the drum 30, i.e., below the front region of the cylindrical part 33 of the drum 30.

The flow path conversion valve 69 serves to change a flow path to enable the wash water at the outlet of the circulation pump 61 to be drained to the outside or to flow toward the circulation hose 63. The flow path conversion valve 69 may be formed integrally with the circulation pump 61.

FIG. 9 is a sectional view illustrating the tub and the wash water circulation device of the washing machine in accordance with an embodiment in a connected state. As shown in FIG. 9, one end of the circulation hose 63 is connected to the flow path conversion valve 69, and the other end of the circulation hose 63 passes through the diaphragm 23 of the tub 20 and is provided with the spray nozzle 64 to spray wash water to the inside of the drum 30. Here, the spray nozzle 64 is located at the guide member 24 adjacent to the opening 31a of the drum 30.

The circulation hose 63 passes through one side of the upper end portion of the diaphragm 23 and is provided at the opening 31a of the drum 30, thereby uniformly spraying the wash water onto laundry. Through such a configuration, when the circulation pump 61 is operated under the condition that the flow path conversion valve 69 is operated to guide the wash water to the circulation hose 63, the wash water located at the lower portion of the tub 20 is sprayed to the inside of the drum 30 through the drain hose 50 and the circulation hose 63.

Further, the position of the circulation hose 63 influences precise sensing of the level of wash water. Hereinafter, the position or shape of the circulation hose 63 will be described.

As shown in FIG. 9, the circulation hose 63 has a curved shape connected to the circulation pump 61 and the upper end of the tub 20. Due to such a shape, the cross-sectional area of the electrodes 67 contacting wash water having the same level is enlarged, as compared to a circulation hose having a rectilinear shape. When the cross-sectional area of the electrodes 67 is enlarged, variation of a capacitance value of the electrodes 67 may be more precisely sensed and thus the level of the wash water may be much more precisely sensed.

Further, when laundry is put into the drum 30, the tub 20 sags due to the weight of the laundry. Such a phenomenon is influenced by dampers and springs of the washing machine and thus generates not only errors of the level of the wash water and deviation of the level of the wash water in different washing machines with respect to the same weight. However, since the circulation hose 63 in accordance with an embodiment is disposed along the outer circumferential surface of the tub 20, the circulation hose 63 also sags and thus deviation of the level of the wash water may be prevented.

Next, another washing machine having the water level sensing apparatus 162 in accordance with an embodiment differing from the washing machine shown in FIGS. 8 and 9 will be described with reference to FIG. 10. The washing machine shown in FIG. 10 omits the circulation hose 63 or the circulation pump 61. The water level sensing apparatus 162 in accordance with an embodiment may be applied to such a washing machine by forming a designated space 164 along which wash water moves at the outside of the tub 120 and installing the water level sensing apparatus 162 in the space 164.

The washing machine in accordance with an embodiment includes a drum 130 installed within a tub 120, the designated space 164 installed at the outside of the tub 120 to sense a level of wash water in the tub 120 such that the wash water in the tub 120 moves and is stored in the designated space 164, a connection hose 163 to guide the wash water from the tub 120 to the designated space 164, and the water level sensing apparatus 162 installed within the designated space 164.

The water level sensing apparatus 162 includes a plurality of electrodes 167 installed between an inner wall 166 and an outer wall 165 of a main body 169 to be opposite to each other, and a micro-computer 160 to calculate a level of wash water in the designated space 164 filled with the wash water through variation of a capacitance value of the plural electrodes 167 and to judge the calculated level of wash water to be a level of wash water in the tub 120.

The operating principle of the water level sensing apparatus 162 in the washing machine in accordance with this embodiment is the same as the above-described operating principle of FIGS. 1 to 3, and a detailed description thereof will thus be omitted.

Figure 11:
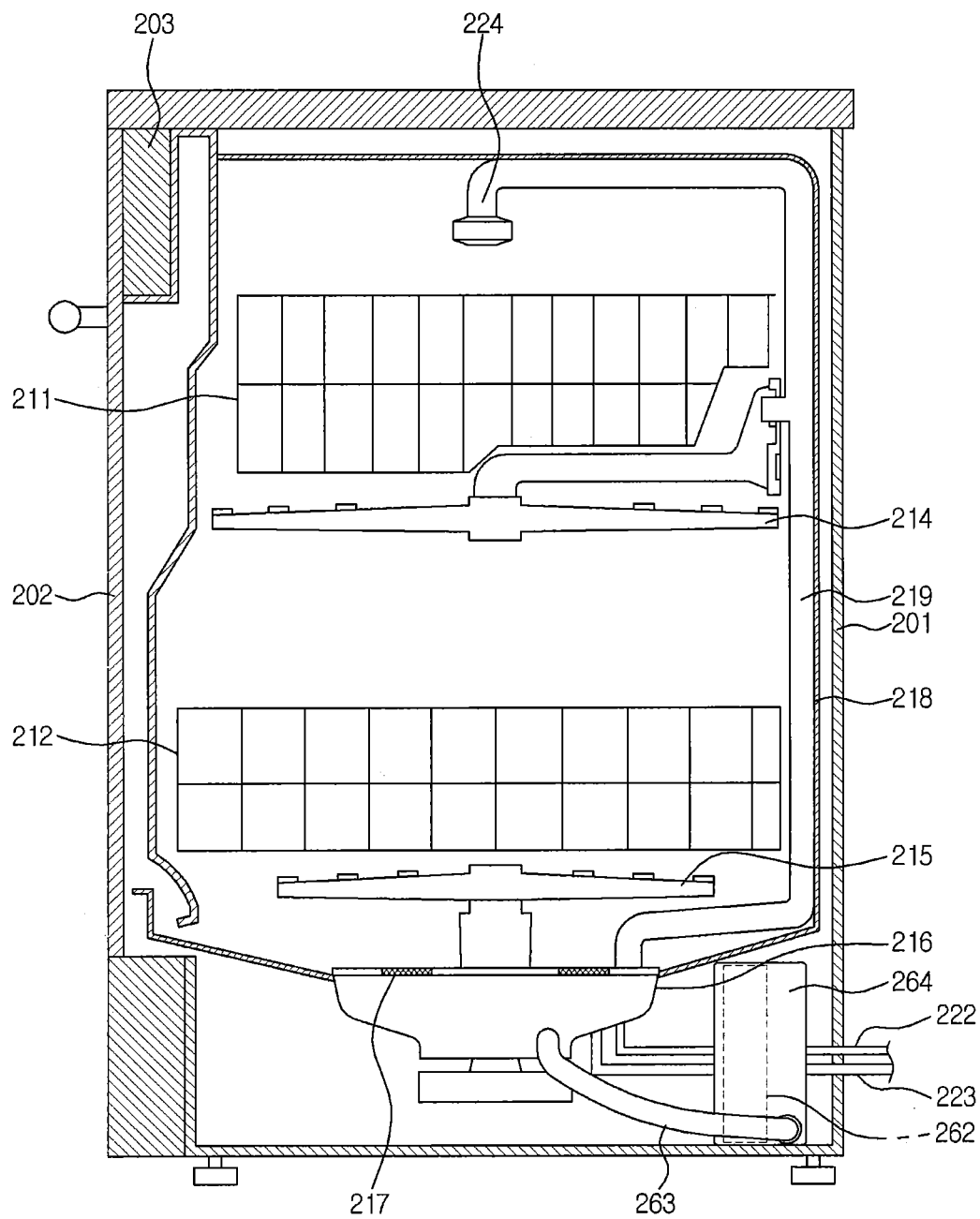
FIG. 11 is a longitudinal-sectional view illustrating a dishwasher having a water level sensing apparatuses in accordance with an embodiment.

The water level sensing apparatus 162 in accordance with an embodiment may be applied to a dishwasher in addition to a washing machine. FIG. 11 is a longitudinal-sectional view illustrating a dishwasher having a water level sensing apparatuses in accordance with an embodiment.

First, the configuration of the dishwasher will be described. The dishwasher includes a case 201 forming the external appearance of the dishwasher and provided with an opened front surface, a door 202 to close the opened front surface of the case 201, and a control panel 203 provided at the upper portion of the door 202 to display and control operation of the dishwasher. A tub 218 to accommodate wash water is provided within the dishwasher, and a sump 216 to collect the wash water and then to spray the wash water after filtering off foreign substances from the wash water is located under the tub 218. A plurality of racks 21 and 212 vertically separated from each other and nozzles 214, 215 and 224 to spray the wash water toward the racks 211 and 212 are provided within the tub 218. A filter 217 is located under the tub 218 to filter out foreign substances from the wash water passing through the filter 217. Further, a wash water path 219 to supply the wash water to the nozzle 214 located at the upper portion of the tub 218 is provided at one side surface within the tub 218. The dishwasher further includes a water supply pipe 222 connecting the tub 218 to the outside of the dishwasher to supply water to the inside of the tub 218, and a water drain pipe 223 to drain contaminated wash water due to washing to the outside of the dishwasher.

In the same manner as the washing machine, the dishwasher includes the sump 216 to collect the wash water, a designated space 264 to which the wash water collected in the sump 216 moves to form the same level of the wash water as the level of the wash water in the sump 216, and a connection hose 263 connecting the sump 216 to a water level sensing apparatus 262 through connector path 261. The operating principle of the water level sensing apparatus 262 in the dishwasher is the same as the operating principle in accordance with the earlier embodiment.

Finally, a process of executing washing through a washing machine having a water level sensing apparatus in accordance with an embodiment will be described with reference to FIG. 12. FIG. 12 is a flowchart illustrating an operating process of the washing machine having the water level sensing apparatus in accordance with an embodiment.

When the washing machine starts to operate, an amount of laundry placed in the drum 30 is sensed (Operation 300).

Thereafter, a level (A) of wash water corresponding to the sensed amount of the laundry is calculated (Operation 310). In order to supply wash water reaching the calculated level (A), the water supply valve is opened (Operation 320). Thereafter, a level (B) of wash water in the circulation hose is sensed by the water level sensing apparatus (Operation 33). Thereafter, the level (A) of the wash water in the drum 30 required to wash the laundry is compared to the sensed level (B) of the wash water in the circulation hose (Operation 340). If the level (A) of the wash water in the drum 30 required to wash the laundry exceeds the sensed level (B) of the wash water in the circulation hose, it is judged that an amount of the wash water proper to wash the laundry is not supplied and thus the process returns to Operation 320 to supply a greater amount of the wash water. If the level (A) of the wash water in the drum 30 required to wash the laundry does not exceed to the sensed level (B) of the wash water in the circulation hose, it is judged that the amount of the wash water proper to wash the laundry is supplied and thus the water supply valve is closed (Operation 350). Thereafter, a washing cycle is performed (Operation 360), and whether or not re-supply of wash water required to perform an additional washing cycle or other cycles is required is judged (Operation 370). If it is judged that re-supply of the wash water is required, the process is retuned Operation 320, and if it is judged that re-supply of the wash water is not required, a spin-drying cycle is performed (Operation 380) and then the process is ended.

As is apparent from the above description, a water level sensing apparatus in accordance with an embodiment more directly measures a water level, as compared to the conventional water level sensing apparatus, thus improving precision in water level measurement. Thereby, the water level sensing apparatus prevents unnecessary water supply and reduces energy consumption. Further, the water level sensing apparatus may sense the water level without change of the structure of a washing machine, etc. to which the water level sensing apparatus is applied, thereby exhibiting a cost reduction effect. Further, the water level sensing apparatus is configured to include electrodes inserted thereinto, thereby preventing corrosion of the electrodes due to exposure of the electrodes to the outside and erosion of the electrodes by water. Moreover, if the water level sensing apparatus is applied to the washing machine, the water level sensing apparatus may use the conventional circulation hose of the washing machine, thus easily sensing a water level in a tub of the washing machine without unnecessary modification of the tub.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. A washing machine comprising:
    a tub;
    a water level sensing apparatus; and
    a connection hose to guide wash water supplied to the inside of the tub of the washing machine to the water level sensing apparatus, wherein:
    the water level sensing apparatus includes a main body provided with an inner wall and an outer wall and filled with water supplied to the inside of the inner wall, a plurality of electrodes inserted between the inner wall and the outer wall to be opposite to each other, a micro-computer to determine a water level in the main body through variation of a capacitance value of the plurality of electrodes, a plurality of electrode exposure parts protruding through the outer wall of the connection hose to expose the plurality of electrodes which face each other, a connector electrically connecting the plurality of electrode exposure parts to the micro-computer and protruding electrode connection parts corresponding to the plurality of electrode exposure parts to electrically connect the plurality of electrode exposure parts to the micro-computer; and the micro-computer determines the determined water level in the main body to be a level of the wash water in the tub.

2. The washing machine according to claim 1, wherein a distance between each electrode and the inner wall of the main body is less than 5 mm.

3. The washing machine according to claim 1, wherein the capacitance value of the plurality of electrodes is linearly increased or decreased in proportion to a rate at which water fills between the plurality of electrodes.

4. The washing machine according to claim 1, wherein the plurality of electrodes is installed on a part or the entirety of the main body.

5. A water supply hose comprising:
an inner wall and an outer wall; and
a water level sensing apparatus including a plurality of electrodes inserted between the inner wall and the outer wall to be opposite to each other, a micro-computer to determine a water level through variation of a capacitance value of the plurality of electrodes, a plurality of electrode exposure parts protruding through the outer wall of the water supply hose to expose the plurality of electrodes which face each other, a connector electrically connecting the plurality of electrode exposure parts to the micro-computer and protruding electrode connection parts corresponding to the plurality of electrode exposure parts to electrically connect the plurality of electrode exposure parts to the micro-computer.

6. The water supply hose according to claim 5, formed in an integral type or a combination type having at least two water supply hose units and a connection unit.

7. The water supply hose according to claim 6, wherein the plurality of electrodes is installed on a part or the entirety of the water supply hose in the integral type.

8. The water supply hose according to claim 6, wherein the plurality of electrodes is installed on at least one of the at least two water supply hose units of the water supply hose in the combination type.

9. The washing machine according to claim 1, wherein the water level sensing apparatus is installed at one side of the inside of the tub.

10. The washing machine according to claim 9, wherein the water level sensing apparatus is attached to the tub and installed along the inner curved surface of the tub.

11. A washing machine comprising:
a cabinet in which a tub is installed;
a circulation hose along which wash water moves from the lower portion of the tub to the upper portion of the tub so as to be circulated;
a circulation pump installed at the circulation hose to forcibly circulate the wash water; and
a water level sensing apparatus includes a plurality of electrodes inserted between an inner wall and an outer wall of the circulation hose to be opposite to each other, a micro-computer to calculate a level of wash water in the circulation hose through variation of a capacitance value of the plurality of electrodes and to determine the calculated level to be a level of the wash water in the tub, a plurality of electrode exposure parts protruding through the outer wall of the connection hose to expose the plurality of electrodes which face each other, a connector electrically connecting the plurality of electrode exposure parts to the micro-computer and protruding electrode connection parts corresponding to the plurality of electrode exposure parts to electrically connect the plurality of electrode exposure parts to the micro-computer.

12. The washing machine according to claim 11, wherein the circulation hose is attached to the tub and installed along the outer circumferential curved surface of the tub.

13. The washing machine according to claim 11, wherein the plurality of electrodes is installed on a part of the circulation hose corresponding to a height range at which wash water or laundry is locatable in the tub.

14. The washing machine according to claim 11, wherein:
the circulation hose includes a plurality of electrode exposure parts protruding through the outer wall of the circulation hose;
the water level sensing apparatus further includes a connector electrically connecting the plurality of electrode exposure parts to the micro-computer; and
the connector includes protruding electrode connection parts corresponding to the plurality of electrode exposure parts to electrically connect the plurality of electrode exposure parts to the micro-computer.

15. A washing machine comprising:
a cabinet in which a tub connected to a circulation hose is installed;
a water level sensing apparatus includes a plurality of electrode exposure parts protruding through an outer wall of the circulation hose to expose a plurality of electrodes which face each other and a micro-computer to calculate a level of wash water in the circulation hose through variation of a capacitance value of the plurality of electrodes and to determine the calculated level to be a level of the wash water in the tub, wherein:
the water level sensing apparatus further includes a connector electrically connecting the plurality of electrode exposure parts to the micro-computer; and
the connector includes protruding electrode connection parts corresponding to the plurality of electrode exposure parts to electrically connect the plurality of electrode exposure parts to the micro-computer.

* * * * *